US011726392B2

(12) United States Patent
Nelson et al.

(10) Patent No.: US 11,726,392 B2
(45) Date of Patent: Aug. 15, 2023

(54) SYSTEM, METHOD, AND COMPUTER-READABLE MEDIUM FOR AUTOFOCUSING A VIDEOPHONE CAMERA

(71) Applicant: Sorenson IP Holdings, LLC, Taylorsville, UT (US)

(72) Inventors: Mark Nelson, South Jordan, UT (US); Conrad Maxwell, Herriman, UT (US)

( * ) Notice: Subject to any disclaimer, the term of this patent is extended or adjusted under 35 U.S.C. 154(b) by 182 days.

(21) Appl. No.: 17/009,567

(22) Filed: Sep. 1, 2020

(65) Prior Publication Data
US 2022/0066286 A1    Mar. 3, 2022

(51) Int. Cl.
H04N 5/225    (2006.01)
H04N 5/232    (2006.01)
H04N 7/14    (2006.01)
G03B 13/36    (2021.01)

(52) U.S. Cl.
CPC .......... G03B 13/36 (2013.01); H04N 5/2257 (2013.01); H04N 5/23212 (2013.01); H04N 7/141 (2013.01)

(58) Field of Classification Search
CPC ...... G03B 13/36; G03B 13/20; H04N 5/2257; H04N 5/23212; H04N 7/141; H04N 5/232121
See application file for complete search history.

(56) References Cited

U.S. PATENT DOCUMENTS

2017/0017136 A1*  1/2017  Kao ..................... H04N 13/239
2017/0212236 A1   7/2017  Van Der Tempel et al.
2018/0164438 A1   6/2018  Van Der Tempel et al.
2018/0343444 A1* 11/2018  Malaescu ............... G03B 43/00
2019/0342491 A1* 11/2019  Mandavilli ........ H04N 5/23219

FOREIGN PATENT DOCUMENTS

CN    112866542 A  *  5/2021

OTHER PUBLICATIONS

English translation of CN-112866542-A (Year: 2019).*

* cited by examiner

Primary Examiner — Shahbaz Nazrul (57) ABSTRACT

Systems, methods, and computer-readable mediums for autofocusing cameras in a videophone are disclosed. A videophone system may include a camera having a lens, a lens actuator configured to move the lens, and an image sensor configured to capture images received through the lens. The videophone system may also include a distance sensor configured to determine an object of focus distance between the camera lens and the object of focus. The system includes memory for storing instructions that when executed by a processor cause the camera lens to automatically focus on the object of focus. The processor includes a lookup table configured to correlate an object of focus distance determined by the distance sensor with a digital number that can be converted by a digital to analog converter to a power value sufficient to power lens actuator to move the lens to a predetermined focus position. The lookup table is configured to correlate an object of focus distance returned by the distance sensor with a digital number representing a lens position, such that the object of focus falls within a depth of field about a focal plane corresponding to the lens position.

28 Claims, 6 Drawing Sheets

SYSTEM, METHOD, AND COMPUTER-READABLE MEDIUM FOR AUTOFOCUSING A VIDEOPHONE CAMERA

TECHNICAL FIELD

The application relates generally to the focusing of cameras in videophone communication systems and devices, and more specifically, to systems, methods, and computer-readable media for autofocusing cameras in videophone communication systems and devices, in a shorter amount of time.

BACKGROUND

Video telephony comprises the technologies used to receive and transmit audio-video signals by users at different locations. A videophone is a telephone with a video display, capable of simultaneous video and audio signals for communication between people in real-time. One important application of videophones allows deaf, hard-of-hearing and speech-impaired ("hearing impaired") people to place telephone calls to hearing-capable or other hearing impaired people using sign language through a Video Relay Service ("VRS"). Videophones are also used to do on-site sign language translation via Video Remote Interpreting ("VRI"). The hearing impaired person or persons place VRS or VRI calls using a videophone, which are routed through an interpreting center. An interpreter, fluent in ASL or a foreign sign language and the equivalent spoken language, appears on the hearing impaired individual's videophone. The hearing impaired caller signs the first part of a conversation to the interpreter, who may simultaneously translate and speak that first part to the call recipient over a phone line. The call recipient may respond by voice to the interpreter with a response. The interpreter translates the response and signs that part to the hearing impaired individual who sees the signed response on their videophone screen. The call recipient may also have a videophone in order to see the hearing impaired caller. Thus, hearing impaired individuals can have calls with hearing impaired or non-hearing impaired individuals in substantially real time. This 24/7 Video Relay Service is provided in the United States by the U.S. government's Telecommunications Relay Service (TRS) fund. Other countries also provide such services free of charge to the hearing impaired community.

Where the video portion of a call is critical, as in the case of persons needing to accurately and clearly see sign language, focus is essential. Most videophones used by the hearing impaired community are in the form of smart phones or cameras mounted on computer or television screens. In these configurations, manual focus is either impractical or not an option at all because of the user's position in front of, not behind the camera lens. Accordingly, videophones typically need an effective and efficient autofocus feature. The problem with videophone autofocus systems, however, is that they are slow. The object of translation services, such as those discussed above, is to make the phone call experience for the hearing impaired community as similar as possible to the non-videophone calls of the hearing-capable community. The measure of success when using videophones and translation services for the hearing impaired community often depends on how closely the call experience can approximate "real time." Anything that slows down the process detracts from the illusion of a "real time" call. Waiting for slow autofocus is such a detraction. Additionally, lulls or lag times created by slower videophone autofocus times can disrupt the natural pace of conversation by those needing to use videophones to communicate. Slower focus times often cause frustration by certain users.

There are typically two types of autofocus techniques; passive autofocus and active autofocus. Generally speaking, passive autofocus works by finding an area of sharpest focus in the image captured by an image sensor for a particular camera lens position. The camera lens is moved in or out using a lens actuator, while an algorithm calculates the sharpness of image for that location of the lens and comparing the sharpness against the prior sharpness, the best focus for the scene in the image is achieved by repeating this procedure. Active autofocus, generally speaking, works by sending a beam of light at the object of focus, and using the response to determine the distance to the object of focus. The problem with most passive autofocus systems is that moving the lens, determining an image contrast, and making a comparison is time consuming and slow. The problem with active autofocus systems is that they can inaccurately determine distance to an object of focus if there is too much ambient light, too many reflective surfaces, or any number of other circumstances.

The problem with both ways of autofocusing, is that the camera doesn't know whether or not the object of focus is actually in optimal focus at a particular distance. To know whether or not the object of focus is in optimal focus requires the eye of a human being. This is how manual focus is accomplished. However, in certain scenarios, such as hearing impaired usage of a videophone camera to send sign language image, focusing the camera with the aid of human eye would be impractically slow as the user moved from the front to the back of the camera lens.

Another problem that contributes to slower autofocus with current camera systems and focus techniques is that typical autofocus algorithms assume that each lens and/or lens actuator, across a batch of cameras of the same make and model, will function precisely the same. This is not always the case. The manufacturing process of camera lenses and lens actuators often result in slight variations between lens and/or lens actuator performance. For example, an imperfection or aberration in one or more lens surfaces can make a subtle difference in focal distance. Similarly, subtle differences in motor winding and spring constants from a laser cut Beryllium copper springs, for example, can affect lens actuator movement, which affects lens focus across a batch of camera units. When lens variance combines with a lens actuator variance, the overall camera unit variance can create a slightly difference focus ability at certain distances across camera units of the same make and model. Accordingly, autofocus techniques that do not account for the uniqueness in each individual lens assembly may not produce an optimal focus for each camera in a batch of cameras or camera parts a given distance.

Accordingly, it would be an improvement over the current state of videophones to increase the speed of autofocus using active autofocus techniques that could simulate human eye sharpness detection to determine optimal lens focus on an object of focus at a particular distance. It would be a further improvement over the current state of videophones to have autofocus algorithms that account for variances in lenses and/or lens actuators across for the same make and model of camera unit being used in the videophone. Embodiments of a videophone camera autofocus systems and autofocus techniques directed to such improvements are disclosed and claimed herein.

SUMMARY

Embodiments described herein include videophone systems with improved autofocusing and methods and computer-readable media for improved autofocusing of a videophone camera. In one embodiment, a videophone system may include a camera lens, a camera lens actuator configured to move the lens, and an image sensor configured to capture images received through the camera lens. The videophone system may also include a distance sensor configured to determine a distance between the camera lens and an object of focus. The system includes a digital to analog converter (DAC) configured to convert a plurality of DAC digital numbers to a plurality of analog power values, each power value used to power the lens actuator and move the lens to a certain lens position. Because each DAC digital number corresponds to camera lens position or distance from the image sensor, driven into such position by an analog power value converted from the DAC digital number, a DAC digital number may be used herein throughout synonymously with the camera lens position corresponding to that DAC digital number.

The video phone system may also include a memory for storing instructions that can be executed by a videophone system processor. The instructions cause the camera lens to automatically focus on the object of focus according to various embodiments disclosed herein. In one embodiment, the memory includes a lookup table configured to correlate a distance to an object of focus calculated by the distance sensor with a DAC digital number corresponding to a lens position where the object of focus is in optimal focus at the calculated distance. In one embodiment, the lookup table is configured to correlate a DAC digital number with a range of distances in front of the camera lens such that if an object of focus lies within the range of distances, the object of focus will be in in optimal focus. It will be appreciated that if the lookup table is set up in advance and verified using human eyes, then optimal focus can be achieved without the need for human verification of sharpness by a user. This allows sharp focus can be achieved in a shorter amount of time.

In one embodiment, one or more processors of the videophone system are configured to execute instructions to verify that the object of focus is in focus using contrast detection analysis on a predetermined region of interest of the image captured by the image sensor at the lens position. The one or more processors may also be configured to facilitate a distance determination by the distance sensor. The one or more processors in one embodiment are configured to determine an optimal focus difference between a particular lens assembly in a batch of lens assemblies and a baseline optimal focus representing the batch of lens assemblies. In this way, the autofocus methods and processes of embodiments disclosed herein can account for lens assembly manufacturing variances and factor them into the autofocus algorithms.

Also disclosed herein are methods of autofocusing the camera of a videophone system. In one embodiment, a method of autofocusing includes determining an object of focus distance between the camera and an object of focus using the distance sensor. The object of focus distance may be correlated to a digital number using a lookup table. In one embodiment, the digital number represents a position of a lens within the camera relative to an image sensor. The digital number may then be converted to an analog power value using a digital to analog converter. Power in the amount of the power value may then be applied to a lens actuator to move the lens to the position represented by the digital number. The lookup table is set up such that a range of object of focus distances all reside within the same depth of field of the lens position's focal plane and in one embodiment, all of the object of focus distances returned by the distance sensor that would lie within the same depth of field are correlated to the same digital number representing the position, and thus the focal plane, of the lens.

The method in one embodiment includes verifying that the object of focus is focused to withing a threshold focus level by performing one or more of contrast detection analysis and phase detection analysis on the image captured by the image sensor at the lens position. In this embodiment, passive autofocus techniques are used to verify and/or adjust the autofocus done by active autofocus techniques. The verification step may be accomplished by analyzing a region of interest that is a subset of the overall image captured by the image sensor. This region of interest may be determined by the user of the videophone system during a self-framing step.

In one embodiment, correlating the object of focus distance determined by the distance sensor to a digital number using a lookup table comprises determining a difference between a camera focus value and a baseline focus value and adjusting the values of the lookup table to account for the difference. The lookup table may be configured to correlate an object of focus distance returned by the distance sensor with a digital number representing a lens position, such that the object of focus falls within a depth of field about a focal plane corresponding to the lens position.

Embodiments disclosed herein also include non-transitory computer-readable medium configured to store program instructions that, when executed on one or more processors, cause the instructions to perform operations. In one embodiment, the operations include determining the distance to an object of focus using a distance sensor. The operation may also include correlating the object of focus distance determined by the distance sensor to a digital number using a lookup table. The digital number may represent a unique position of the lens within the camera relative to the image sensor, or in other words, a unique distance from the image sensor to the lens. In one embodiment, the digital number is converted to a corresponding an analog power value using the digital to analog converter. The power value may be used to power the lens actuator to move the lens to the position represented by the digital number. The lookup table is configured such that this position places the object of focus in optimal focus.

The instructions stored in the non-transitory computer-readable medium may include those instructions necessary to carry out the autofocus methods and functionality of the videophone embodiments disclosed herein throughout.

DETAILED DESCRIPTION

In the following detailed description, reference is made to the accompanying drawings which form a part hereof, and in which are illustrated specific embodiments of the present invention. These embodiments are described in sufficient detail to enable those of ordinary skill in the art to practice the disclosure. It should be understood, however, that the detailed description, while indicating examples of embodiments of the disclosure, are given by way of illustration only and not by way of limitation. Accordingly, various substitutions, modifications, additions rearrangements, or combinations thereof are within the scope of this disclosure.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Additionally, various aspects or features will be presented in terms of systems or devices that may include a number of devices, components, modules, and the like. It is to be understood and appreciated that the various systems and/or devices may include additional devices, components, modules, etc. and/or may not include all of the devices, components, modules etc. discussed in connection with the figures. Furthermore, all or a portion of any embodiment disclosed herein may be utilized with all or a portion of any other embodiment, unless stated otherwise. Accordingly, the present invention is not limited to relative sizes or intervals illustrated in the accompanying drawings.

In addition, it is noted that the embodiments may be described in terms of a process that is depicted as method steps, a flowchart, a flow diagram, a schematic diagram, a block diagram, a function, a procedure, a subroutine, a subprogram and the like. Although the process may describe operational steps in a particular sequence, it is to be understood that some or all of such steps may be performed in a different sequence. In certain circumstances, the steps be performed concurrently with other steps.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in this disclosure should not be interpreted as excluding the embodiments of the disclosure. Additional term usage is described below to assist the reader in understanding the disclosure.

The terms "have," "may have," "include," and "may include" as used herein indicate the presence of corresponding features (for example, elements such as numerical values, functions, operations, or parts), and do not preclude the presence of additional features.

The word "exemplary" is used herein to mean "serving as an example or illustration." Any aspect or design described herein as "exemplary" is not necessarily to be construed as preferred or advantageous over other aspects or designs.

The terms "A or B," "at least one of A and B," "one or more of A and B", or "A and/or B" as used herein include all possible combinations of items enumerated with them. For example, use of these terms, with A and B representing different items, means: (1) including at least one A; (2) including at least one B; or (3) including both at least one A and at least one B. In addition, the articles "a" and "an" as used herein should generally be construed to mean "one or more" unless specified otherwise or clear from the context to be directed to a singular form.

Terms such as "first," "second," and so forth are used herein to distinguish one component from another without limiting the components and do not necessarily reflect importance, quantity, or an order of use. For example, a first user device and a second user device may indicate different user devices regardless of the order or importance. Furthermore, a reference to first and second elements does not mean that only two elements may be employed there or that the first element must precede the second element in some manner. Also, unless stated otherwise a set of elements may comprise one or more elements.

It will be understood that, when two or more elements are described as being "coupled", "operatively coupled", "in communication", or "in operable communication" with or to each other, the connection or communication may be direct, or there may be an intervening element between the two or more elements. To the contrary, it will be understood that when two or more elements are described as being "directly" coupled with or to another element or in "direct communication" with or to another element, there is no intervening element between the first two or more elements.

Furthermore, "connections" or "communication" between elements may be, without limitation, wired, wireless, electrical, mechanical, optical, chemical, electrochemical, comparative, by sensing, or in any other way two or more elements interact, communicate, or acknowledge each other. It will further be appreciated that elements may be "connected" with or to each other, or in "communication" with or to each other by way of local or remote processes, local or remote devices or systems, distributed devices or systems, or across local or area networks, telecommunication networks, the Internet, other data communication networks conforming to a variety of protocols, or combinations of any of these. Thus, by way of non-limiting example, units, components, modules, elements, devices and the like may be "connected", or "communicate" with each other locally or remotely by means of a coaxial cable, fiber optic cable, twisted pair, digital subscriber line (DSL), shared chipset or wireless technologies such as infrared, radio, and microwave.

The expression "configured to" as used herein may be used interchangeably with "suitable for," "having the capacity to," "designed to," "adapted to," "made to," or "capable of" according to a context. The term "configured" does not necessarily mean "specifically designed to" in a hardware level. Instead, the expression "apparatus configured to . . . " may mean that the apparatus is "capable of . . . " along with other devices or parts in a certain context.

Information and signals described herein may be represented using any of a variety of different technologies and techniques. For example, data, instructions, commands, information, messages, signals, bits, symbols, and chips that may be referenced throughout the description may be represented by voltages, currents, electromagnetic waves, magnetic fields or particles, optical fields or particles, lasers or any combination thereof. Some drawings may illustrate signals as a single signal for clarity of presentation and description. It should be understood by a person of ordinary skill in the art that the signal may represent a bus of signals, wherein the bus may have a variety of bit widths and the embodiments disclosed herein may be implemented on any number of data signals including a single data signal.

Various aspects of the embodiments described herein are referred to as having, or as being implemented by a "device", "component", or "module". The labels given these items should not be used to limit the scope of the embodiments. Indeed, the term "implementing structure" is meant to include any structure used to implement the various functions, features, aspects, algorithms, methods, or processes of the embodiments described herein and may be configured in a variety of ways without departing from the scope of the present invention. "Implementing structures" include hardware, software, firmware or a combination of these. "Implementing structures" include, without limitation, a field programmable gate array (FPGA), an application specific integrated circuit (ASIC), or a programmable-logic device. An "implementing structure" may be configured to be in an addressable storage medium or to execute one or more processors. "Implementing structures" may include, without limitation, elements such as software elements, object-oriented software elements, class elements, and task elements, processes, functions, attributes, procedures, sub-routines, segments of program codes, drivers, firmware, micro-codes, circuits, data, database, data structures, tables, arrays, logic blocks and variables.

A "module" may be any type of executable or implementing structure capable of carrying out instructions to perform operations.

A "processor," as may be referenced herein throughout, may be any processor, controller, microcontroller, state machine or combination of the foregoing suitable for carrying out the processes of the disclosure. A processor may also be implemented as a combination of computing devices, such as a combination of a DSP and a microprocessor, a plurality of microprocessors, one or more microprocessors in conjunction with a DSP core, or any other such configuration. Reference to a "processor" should not be limited to residing to any one particular device but includes all processors or a subset of all processors whether they reside on a single or multiple devices.

References to "memory" are intended to comprise, without being limited to, any structure that can store, transmit, and/or receive data or information related to the embodiments described herein, or components, modules or units of the embodiments described herein. "Memory," as referenced herein, can be either volatile memory or nonvolatile memory, or can include both volatile and nonvolatile memory. "Memory" includes computer-readable media and medium.

As used herein, "videophones" include any video-capable equipment that can process, convey, reproduce, capture, detect, transmit, identify, or otherwise utilize multi-frame images. As non-limiting examples, such equipment includes conventional cellular telephones containing a camera, and desktop computers or mobile computing devices with a camera and image display.

The disclosure provides meaningful limitations in one or more particular technical environments that go beyond an abstract idea. For example, embodiments of the disclosure provide improvements in the technical field of telecommunications, relay services for the audibly-impaired, and in particular developing new communication devices that include new features and functionality for the user devices as well as the relay service devices.

Like reference numerals may be used to denote like features throughout the specification and figures.

Figure 1:
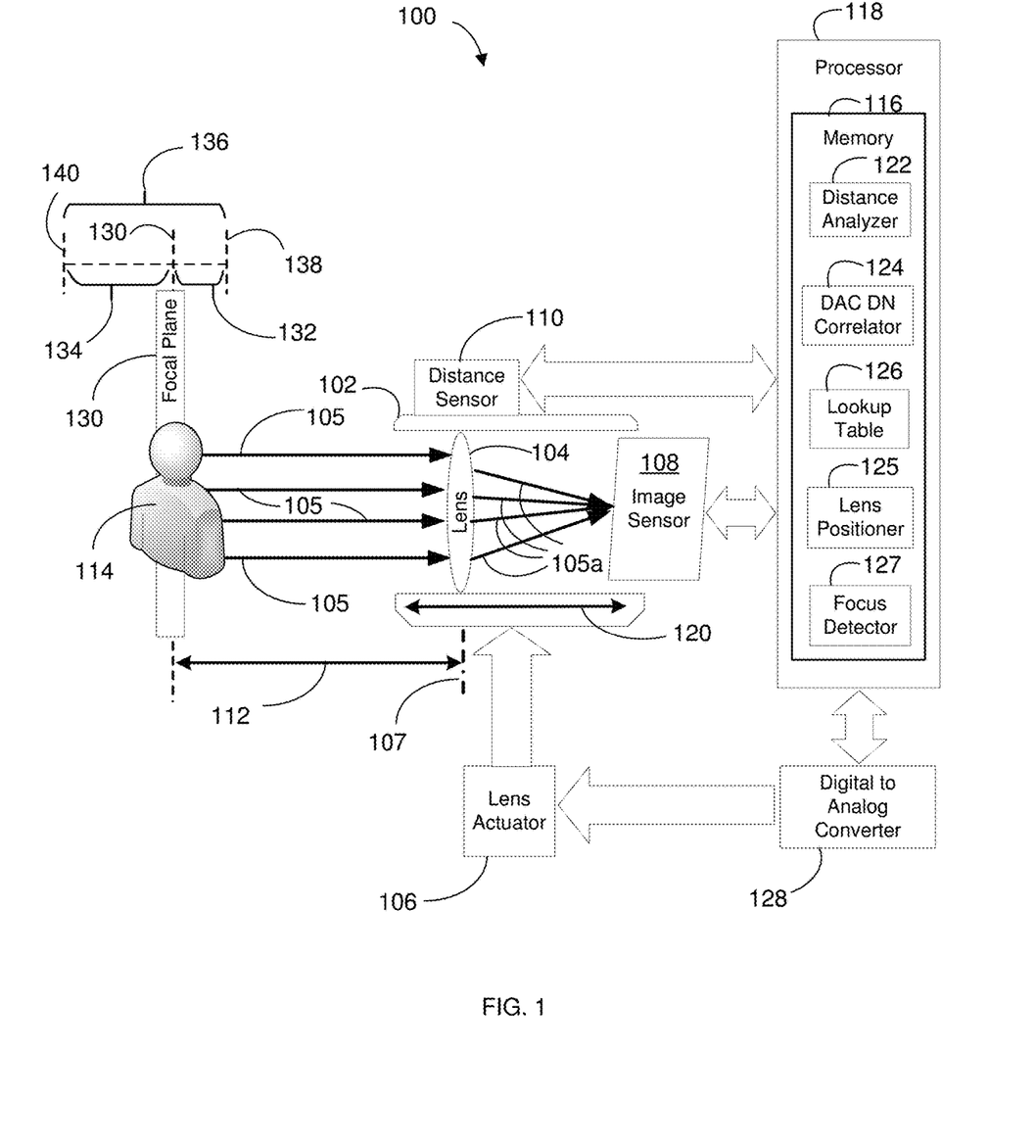
FIG. 1 is a schematic diagram of a videophone autofocusing camera system in accordance with one or more embodiments of the disclosure.

Referring now to FIG. 1, one embodiment of a videophone system 100 is shown. The videophone system includes a camera 102 having a camera lens 104, a camera lens actuator 106 configured to move the lens 104, and an image sensor 108 configured to capture images received through the camera lens 104. The videophone system 100 may also include a distance sensor 110 configured to calculate a distance 112 between the camera lens 104 and an object of focus 114. In one embodiment, the videophone system 100 includes a digital to analog converter (DAC) 128 configured to convert a plurality of DAC digital numbers to a plurality of analog power values. Each power value may be used to power the lens actuator 106 to move the lens 104 to a lens position 107 along a lens displacement path 120. Each lens position 107 represents a distance between the lens 104 and the lens sensor 108. Where the lens 104 causes light 105 from an object of focus 114 to refract and converge at a single point on the image sensor 108, the object of focus is said to be in focus. Where the refracted light 105*a* does not converge on the image sensor 108, than the object of focus is not in optimal focus and the lens 104 may need to be moved in or out in until the refracted light 105*a* does converge on the image sensor 108, at which lens position, the object of focus will be in optimal focus.

The lens 104 of the camera 102 may consist of a single lens or multiple lens elements. The lens 104 may be part of a larger lens assembly 104. Typically, while a camera 102 may have multiple lens 104, usually one of the lens 104 is a primary lens 104. Additionally, while it is possible to focus on an object of focus by changing the position of the entire lens assembly, for some videophone application embodiments, a smaller, dedicated lens group may be the only part to be moved when focusing is performed. This allows for faster internal focusing of the lens 104 because there is less weight to be moved. Regardless of whether the embodiment 100 has one or multiple lenses 104, an array of individual lenses combines to a group and performs like a single lens 104 in principle. Accordingly, the term "lens," as used herein throughout, shall include multiple camera lenses and camera lens assemblies.

The lens 104 may be defined by any number of characteristics known to those of skill in the art, including without limitation, a minimum focus distance, a refractive index, a radius of curvature for both lens surfaces, a thickness, and the like. The purpose of lens 104 is to redirect light 105 onto the image sensor 108 in order to focus the camera 102 on the object of focus 114. The focal length of the lens 104 is the distance between the lens 104 and the image sensor 108 when the object of focus 114 is in optimal focus. In one embodiment, the relationship of the focal length to the object of focus distance 112 and to the distance of lens 104 to the image sensor 108 when the object of focus is in optimal focus can be represented by the formula:

$$1/f = 1/d_o + 1/d_i \qquad (1)$$

where f is the focal length of the camera, $d_o$ is the object of focus distance 112, and di is the distance between the lens 104 and the image sensor 108. This relationship demonstrates that every lens position 107 will have a unique optimal focus for an object of focus 114 at a given distance 112.

The perfect point of focus for a camera lens 104 in a given position relative to the image sensor 108 is referred herein throughout as the focal plane 130. In one embodiment, the focal plane can be thought of as the distance between the camera lens 104 and the perfect point of focus in an image of an object of focus 114. The focal plane 130 is in front of the camera lens 104 spanning horizontally. For a lens 104, set to the same aperture setting, there is only a single object of focus distance 112 that will be in the sharpest focus for that particular lens. If one were to move the lens 104, all other things being equal, one effectively move the focal plane 130.

Everything in front of or behind the focal plane is out of focus to one degree or another. The foregoing notwithstanding, there is an area 132 in front of each focal plane 130 and an area 134 beyond each focal plane 130 where the human eye cannot tell that an image of an object of focus in these areas 132, 134 is not in focus, despite the fact the object of focus 114 does not reside in the focal plane 130. The areas 132 and 134 make up a depth of field 136 for a particular focal plane 130, and by extension, for a particular lens position 107 relative to the image sensor 108. The total depth of field 136 is the distance between the farthest and nearest objects in a scene that appear acceptably sharp in an image where the lens is focused, or in other words, where the lens is positioned relative to the image sensor 108. Objects of focus residing in a depth of field for a given focal plane of a lens position 107 may be referred to herein throughout as being in "optimal focus." Additionally, an object of focus may be referred to as being in "optimal focus" herein throughout when the object of focus is in the area 132 in front of any focal plane 130 and/or the area 134 beyond such focal plane 130 where the human eye cannot tell that an image of an object of focus in these areas 132, 134 is not in focus.

Accordingly, for each focal plane 130, there is a near limit 138 and a far limit 140 to the depth of field 136. The near limit 138 can be defined as the distance between the camera lens 104 and the first object of focus that is considered to be acceptably sharp. Similarly, the far limit 140 can be defined as the distance between the camera lens 104 and the farthest object of focus 114 that is considered to be acceptably sharp.

In one embodiment, the depth of field 136 for a particular lens 104 focusing at a particular distance can be determined or approximated by using the focal length, the object of focus distance 112, the acceptable circle of confusion size, and aperture using the equation:

$$\text{Depth of Field} = 2u^2 Nc/f^2 \qquad (2)$$

where c is a given circle of confusion, f is the focal length, N is the F-number (f/D for aperture diameter D), and u is the object of focus distance.

It will be appreciated by those of skill in the art that at longer object of focus distances 112, the rear limit 140 of the depth of field 136 may reach all the way to infinity as the lens 104 moves away from the image sensor 108 and field of view angle narrows. The ratio between the front area 132 to the rear area 134, as the object of focus distance 112 increases, approaches 1:00. The shortest object of focus distance 112 at which the rear limit 140 reaches infinity is referred to as the hyperfocal distance. Stated another way, the hyperfocal distance is the closest distance at which a lens 104 can be focused while keeping objects at infinity acceptably sharp.

The hyperfocal distance for a particular lens 104 may be determined using the lens' focal length, the F-number, and an acceptable circle of confusion size according to the following formula:

$$\text{Hyperfocal Distance} = (f \times F/N) \div C \qquad (3)$$

where f is the focal length, N is the F-number (f/D for aperture diameter D), and c is the circle of confusion size. Because the hyperfocal distance does not depend on object of focus distance 112, it can be calculated simply based on lens characteristics.

Once the hyperfocal distance for a particular lens 104 is known, the near limit 138 and the far limit 140 can be calculated using the hyperfocal distance, the focal length, the F-number and the object of focus distance 112 according to formulas known in the art.

Because the cameras 102 used in most videophone applications are small and shutterless, in one embodiment, the aperture is fixed and thus the F-number value for this embodiment can be ignored. This simplifies hyperfocal distance and depth of field calculations for embodiments of the present invention and leaves the object of focus distance 112 as the only variable for determining the depth of field 136 for any given lens position 107. Accordingly, the videophone manufacturer or assembler can position an object of focus 114, such as, for example a focus chart, at varying known distances in front of the camera to approximate a focal plane distance 112, and the corresponding near limit 138, far limit 140, and depth of field 136 for that focal plane 130. This can be done for any distance between the minimum focus distance and the hyperfocal distance for any particular lens 104. As will be discussed in more detail in conjunction with FIG. 2 below, this allows one of skill in the art to graph the approximate correlations between object of focus distances 112 and the position of the lens 104 at those distances when the object of focus is in optimal focus.

The camera 102 also includes a lens actuator 106 for moving the lens 104 toward or away from the image sensor 108. In one embodiment, the lens actuator 106 is part of the lens assembly 104. In another embodiment, the lens actuator 106 and the lens 104 may also be part of the image processor circuit. The lens actuator 106 may be any number of devices or components know to move camera lens including, without limitation, a micro-electro-mechanical-system (MEMS) or other micro- or nano-sized motors, a linear electromagnetic focusing motor (LEM), a piezo electronic motor, a stepper motor, and ultrasonic motor, a supersonic motor, a DC motor, a gear or screw type motor, and the like. The lens actuator 106 may include a single, dual or multiple drives. The drives may be direct drives or indirect drives. It will be appreciated by those of skill in the art that depending on size or other constraints, the lens actuator 106 can be any device that can provide power to move a lens or lens assembly in response to a digital control.

In one embodiment, the lens actuator 106 is a voice coil motor (VCM) mounted directly to a printed circuit board over the image sensor 108. It will be appreciated by those of skill in the art that VCMs are a good lens actuator 106 for videophone system applications because they are mechanically robust, shock-resistant, small, and relatively inexpensive. In one embodiment, the lens actuator 106 is without hysteresis and therefore has a direct current-vs.-position relationship that allows for precise lens positions 107 and precise focusing.

The camera 102 also includes an image sensor 108. The image sensor 108 may be a Complementary Metal Oxide Semiconductors (CMOS), Charge-Coupled-Device (CCD), or any other suitable imaging device. In one embodiment, the image sensor 108 may be coupled to an analog front-end processor (AFE), which amplifies and conditions the raw video signal, and converts it to digital. Once the image is in digital form, it can be analyzed using passive autofocus techniques including, without limitation, contrast detection and phase detection, for focus verification and/or focus determination. The image could also be analyzed and digital data could be used for lens adjustment, and other processes. In certain embodiments, the image sensor 108 can include film.

The videophone system 100 also includes a distance sensor 110. The distance sensor 110 in one embodiment allows the videophone system 100 to use active autofocus techniques. The distance sensor 110 may be any sensor of a type known in the art to determine or measure distance. These may include, without limitation, a sonar system, an infrared triangulation system, an infrared light reflection system, and the like.

In one embodiment, the distance sensor 110 is a Time of Flight (ToF) sensor 110. The distance sensor 110 may be separate from the optical system and not in communication with the image capturing lens. In another embodiment, the distance sensor 110 is in operable communication with the optical system. It will be appreciated by those of skill in the art that by using a ToF sensor 110, distance to the object of focus 114 can be accomplished in a number of ways. For example, the ToF sensor 110 may use the phase shift of an amplitude-modulated wave to determine or approximate a distance 112 between the lens 104 and an object of focus 114. In this embodiment, the distance sensor 110, may use continuous infrared light waves to detect the phase shift of the reflected light to determine depth and distance. By modulating the amplitude of the wave, the distance sensor 110 creates a light source of a sinusoidal form with a known frequency. This allows a detector within the distance sensor 110 to be able to determine the phase shift of the reflected light. Thus, various points in the image scene can be calculated to find depth by using the equation:

$$C = \lambda \times f \quad (4)$$

where c is the speed of light (c=3×10$^8$ m/s), $\lambda$ is one wavelength ($\lambda$=15 m), and f is the frequency.

In another embodiment, the distance sensor 110 uses timed pulses to determine the distance 112 of an object of focus by starting a timer during the exit of the infrared beam and measuring the time it takes for a receiver to receive the beam after is has reflected off of the object of focus and returned. Using equation (4), points on the object surface can be determined and the depth or distance of the object calculated. In one embodiment, the distance analyzer 122, or set of instructions stored in memory 116 and executable by the processor 118 to analyze distance using the distance sensor 110, computes the time difference between the time the outbound infrared light pulses are sent and the inbound infrared pulses are received. In this way, the processor and/or distance sensor can compute the distance 112.

It will be appreciated by those of skill in the art that the distance sensor 110 can be configured in many ways, including having the light emitter and/or receiver configured as part of the camera 102 or camera lens assembly 104. The distance sensor 110 in some embodiments may include its own processor for making the depth or distance calculations.

The distance returned by the distance sensor 110 can be used to move the lens 104 into a different position to assist in focusing the lens 104 on an object of focus. In one embodiment, the processor 118 provides a digital output or signal that must be converted into an analog power amount before it can be used by the VCM 106 to reposition the lens 104. This can be accomplished using a digital to analog converter (DAC) 128. In one embodiment, the DAC is configured to convert a plurality of DAC digital numbers into a corresponding plurality of analog power values. The DAC 128 may be any DAC known in the art to convert digital numbers to analog power values for the purpose of powering lens actuators 106. The DAC 128 in one embodiment is part of the processor 118. In another embodiment, the DAC 128 may be part of the lens actuator 106, itself. In one embodiment, the DAC 128 is a 10-bit current-output DAC with output-current-sink capability. In another embodiment, the DAC 128 is a 12-bit current-output DAC configured with appropriate resistors and/or diodes to generate the current required to drive the VCM lens actuator 106. The choice of DAC 128 can depend on a number of factors, including without limitation, videophone space requirements or limitations and the size and power needs of the lens actuator. It will be appreciated by those of skill in the art that a 12-bit DAC 128 allows for up to 4,096 digital inputs, or in other words, DAC digital numbers.

The DAC 128, in combination with lens actuator 106, repositions the lens 104 in response to a signal or input from the distance sensor 110 to provide sharper focus on an object of focus 114. One problem with present autofocus apparatus and methods is that the camera doesn't know whether its in focus. When the lens is focused manually, a human user looks through a viewfinder or a screen and verifies that the object of focus is optimally sharp. So even if the camera has an approximation of the object of focus distance 112, it still can't know for certain whether the object of focus is in optimal focus without human intervention. Accordingly, focus algorithms are often run and re-run trying to simulate the human eye, which takes additional time and still doesn't completely remove the uncertainty surrounding whether or not the object of focus is in optimal focus. Embodiments of the present invention overcome this problem using a novel lookup table.

The memory 116 in one embodiment, includes a lookup table 126 configured to correlate a DAC digital number, or in other words a lens position 107, to a distance 112 between the camera lens 104 and an object of focus 114 where the object of focus 114 is in optimal focus at the distance 112. As will be discussed in greater detail below, the lookup table 126 may be configured to correlate a DAC digital number to a range of distances between the camera lens 104 and an object of focus 114 wherein the object of focus 114 is in optimal focus when the object of focus 114 is within the range of distances. In one embodiment, the range of distances correlating to a DAC digital number is within a depth of field 136 about a focal plane 130 for a lens position 107 associated with the DAC digital number.

One advantage of this embodiment is that the lookup table 126 includes ranges of optimal focus determined by human eyes or verified by human eyes after utilizing the equations discussed above to provide approximations. In one sense, the lookup table 126 acts as a database of human optimal focus verification for a desired object of focus 114 positioned at any desired or predetermined distance between the minimum focus distance of the lens 104 and the hyperfocal distance of the lens 104. This is accomplished because the lookup table is configured to correlate an object of focus distance 112 returned by the distance sensor 110 with a digital number representing a unique lens position 107, such that the object of focus 114 falls within a depth of field 136 about a focal plane 130 corresponding to the lens position 107. As will be discussed in greater detail below, the lookup table 126 values can be determined for any lens being used in the production or manufacture of a particular videophone system 100 and programmed into the videophone's software, firmware, hardware, and the like. It will be appreciated that in this embodiment, the human eye influence can be introduces or factored into the autofocus process.

The videophone system 100 includes a processor operatively coupled with the memory 116 and configured to execute the instructions to perform operations. The operations include calculating a distance 112 between the camera lens 104 and an object of focus 114 using the distance sensor. This may be accomplished by a distance analyzer module 112. The operations further include correlating the calculated distance to a DAC digital number using the lookup table 126. In one embodiment, this is accomplished using a DAC digital number (DN) correlator 124. The DAC DN correlator 124 may include a module to perform operations for determining a difference between a DAC digital number associated with the lens 104 positioned for optimal focus at a desired or predetermined distance from the lens and a baseline DAC digital number representing a lens positioned for optimal focus at the same desired or predetermined distance. The processor 118 is further configured to adjust the lookup table 126 to account for the difference. The processor 118 is so configured to execute instructions in memory to power the lens actuator 106 using the analog power value converted from the correlated DAC digital number move the lens to a lens position 107 wherein the object of focus is in optimal focus at the calculated distance. In one embodiment, this is accomplished using a lens positioner module 125. Additionally, the processor 118 may also be configured to perform operations to verify that the object of focus 114 is in optimal focus at the calculated distance by performing one or more of contrast detection analysis and phase detection analysis on the image captured by the image sensor at the lens position 107. This may be done using a focus detector module 127. In one embodiment, as will be discussed in greater detail below, verifying that the object of focus 114 is in optimal focus includes selecting a region of interest for the image captured by the image sensor 108 at the lens position 107 and performing contrast detection analysis on the region of interest.

It will be appreciated that the ToF infrared sensor 110 may produce inaccurate distances under certain circumstances. This may occur for example when light from an open flame or bright ambient light such as sunshine scatters to much light into the sensor's receiver and confuses the infrared sensor. The infrared beam may be partially or fully absorbed by a black surface or bounce off an object that is not the object of focus 114. Other environmental factors such as color, gloss, scene complexity, or multiple reflections may also affect the accuracy of a ToF distance sensor 110. Accordingly, as a verification measure, even though the active autofocus combined with a lookup table may have optimally focused on the object of focus 114, passive auto focus techniques such as contrast detection and phase matching detection may be used.

It will be appreciated by those of skill in the art that contrast detection may be accomplished using one or more of a "hill climbing" algorithm, a global search algorithm, a Fibonacci search algorithm and the like. In contrast detection, the focusing lens is driven in a predefined direction while successively taking snapshots of the contrast situation in order to determine the orientation of a gradient. If the contrast decreases, the system changes the direction of the lens movement immediately. As long as the contrast increases, the lens keeps moving until the contrast data has a peak value. To confirm whether the contrast data is actually at its peak, the focusing lens is driven so as to surpass the focused position, detecting lower contrast again. Consequently, as a last step, the focusing lens is driven back to the position that has produced the peak signal, representing optimal focus. Accordingly, as used herein throughout, the term "optimal focus" may be used to describe an object of focus that is within ten DAC digital numbers above or below the DAC digital number for the lens position 107 where the contrast data associated with an image at the DAC digital number lens position 107 is at its peak. In one embodiment, the threshold for a contrast analysis focus verification or determination is within five DAC digital numbers above or below the DAC digital number for the lens position 107 where the contrast data associated with an image at the DAC digital number lens position 107 is at its peak. It will be appreciated that the videophone functionality or operation need not cease while the verification process is being performed. Indeed, if the lookup table autofocus method has performed effectively, the verification step would not be needed.

As will be discussed in greater detail in conjunction with FIGS. 4 and 4A, in one embodiment, only a subset of the entire image is analyzed for contrast. In this embodiment, the user of the videophone system is given an opportunity to frame their face and/or torso by manipulating a frame graphic over their face. This graphic frame identifies the region of interest that the processor 118 will use contrast detection analysis on in order to determine optimal focus.

The processor 118 may be in operable communication with the lens 104, the lens actuator 106, the image sensor 108, the distance sensor 110, the memory 116, and the digital to analog converter 128 directly or indirectly. Each of these components or structures 104, 106, 108, 110, 116, and 128 may also be in operable communication with one or more of the other components 104, 106, 108, 110, 116, and 128, either directly or indirectly.

It will be appreciated by those of skill in the art that the videophone system 100 and/or camera 102 can be configured in a variety of ways to accomplish the teachings of the present invention. Indeed, an image signal processor associated with the image sensor 108 may by the same as an overall system processor 118. Additionally, individual components distance such as the distance sensor 110, lens actuator 106, DAC 128, image sensor 108 may have their own processor or processor that may communicate directly or indirectly with processor 118 or through processor 118 to another processor or processors within the videophone system 100. The term "processor," as used herein throughout, shall be deemed to include one or more of these processors. Similarly, the lookup table or other code written for distance analysis, contrast or phase detection, table conversions and correlations, digital to analog conversions, or any other code or instructions used to perform any of the functions or processes disclosed herein throughout, need not necessarily reside in the memory 116, and may take the form or firmware or hardware residing in one or more of the processors or components of the videophone system 100.

Additionally, the memory 116, although depicted as being part of the processor 118 may reside anywhere or in multiple places, including without limitation, outside of the physical videophone system 100.

Although not shown, the system 100 may include I/O devices in addition to cameras, including without limitation, microphones, remote controls, touch screens, keyboards, video displays, speakers, and any other I/O devices used in videophones and that may be necessary to accomplish the teachings of embodiments disclosed herein.

Figure 2:
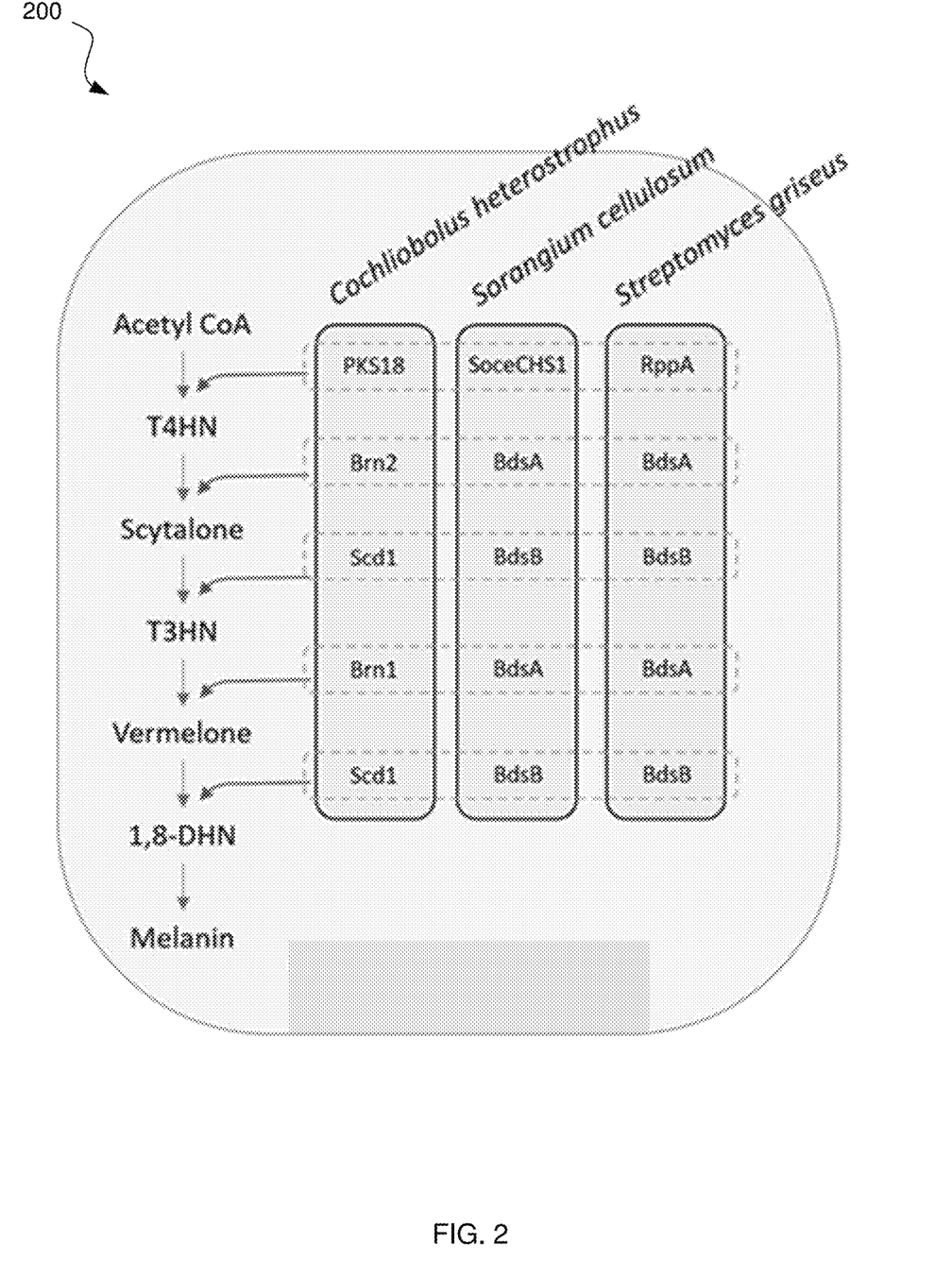
FIG. 2 is a graph of representative focus curves for three lens assemblies from a batch of lens assemblies and a baseline focus curve representing the batch in accordance with one or more embodiments of the disclosure.

Turning now to FIG. 2, a graph 200 plots DAC digital numbers against object of focus distances in millimeters. The graph illustrates three representative focus curves 202, 204, and 206 for three different camera lens assemblies respectively. It will be appreciated that "lens assembly" as used in describing graph 200, includes, without limitation, the lens, the lens actuator, the image sensor, and the printed circuit board on which these may reside, either alone or in combination.

It is to be understood that lens assemblies, regardless of care taken in manufacturing and design, are not perfect and introduce some degree of distortion or aberration that makes the image an imperfect replica of the object of focus. Thus, similar lens assemblies received from a supplier may have a slightly different focus at various object of focus distances. In one embodiment, in order to normalize, or adjust for focusing variations of the lens assemblies, a representative or "baseline" focus curve 208 is plotted. This baseline curve 208 can then be used as a point of comparison to a focus curve for any lens assembly provided by of supplier when assembling or manufacturing a camera for a videophone or videophone system.

In one embodiment, the baseline curve 208 is determined by analyzing a representative sample of lens assemblies to be used in the desired autofocus application. The representative lens assemblies may all be from the same batch or from different batches. The representative lens assemblies may each be focused at various distances in front of the camera lens where an object of focus might be for the desired application. In one embodiment, each of the representative lens assemblies is focused at a distance and image sharpness is verified with the human eye to establish that each representative lens is in optimal focus at the distance. The DAC digital number for the lens position is noted and plotted against each distance for each lens assembly. Graph 200 is a representation of such a distance interval focus exercise for three representative camera lens yielding focus curves 202, 204, and 206 respectively. It will be appreciated that because sharp focus at a given distance was confirmed by human eyes, the DAC digital numbers in the graph correspond to optimally focused lens assemblies at a given distance for each such lens assembly. An average or baseline focus curve 208 can be determined by plotting the average DAC digital number of the three lens assemblies at multiple distances. It will be appreciated that the baseline focus curve 208 is an optical focus curve representation for the lens assemblies used in the videophone system.

In one embodiment, representative lens assemblies might be focused every 75 millimeters along a desired distance range of object of focus distances that are useful for a particular application. For example, a desired distance range for videophone autofocus applications used by hearing-impaired persons might be between about 22 mm and 2.3 meters or 2300 mm, as is represented on graph 200. For each 75 mm distance interval, the DAC digital number representing the lens position's optimal focus (as verified or determined by the human eye) at that distance, could be plotted against the distance. Thus, a focus curve representing optimal focus positions for each representative lens assembly could be established. In some embodiments, a focus determination interval distance of 150 mm may be used to create the representative lens assembly focus curve. In other embodiments, 300 mm or 450 mm focus interval distances may be used to establish a representative focus curve for a particular lens assembly. Combinations of various interval focus distances may also be used. It will be appreciated by those of skill in the art that different lenses for different lens applications will produce different representative curves. However, where all variables other than distance are fixed, optimal focus curves can be established for most lenses by moving an object of focus at certain distance intervals away from the lens, having a human verify the sharpness of the focus, or in other words optimal focus, and noting the DAC digital associated with the lens position.

Because lens assemblies have mechanically finite variation possibilities, if enough representative lens assemblies are focused at the same predetermined distance, a gaussian distribution average of each representative lens assembly can be determined for that distance. By determining similar gaussian averages at different distances, an average focus curve 208 can be established representing optimally focused lens positions at object of focus distances over the length of desired distance. It will be appreciated by those of skill in the art that if representative lens to be analyzed using the human observed interval focus method over a range from a minimal desired distance in front of the lens to the hyperfocal distance of the lens, then a baseline Gaussian distributed focus curve for optimal focus can be determine from that minimal distance to infinity. In one embodiment, a baseline representative optimal focus curve is used to determine the lookup table values for the lens assembly used in the videophone system.

Returning again the graph 200, curves 202, 204 and 206 could be said to represent the results of the human interval distance focusing described above for three representative lens assemblies. A representative baseline focus curve 208 could be the average of the three curves 202, 204, and 206.

Each of the curves 204, 206, and 208 could also represent different lens assemblies acquired or tested after a baseline 208 has been established. In this scenario, the optimal focus of a newly acquired lens assembly could be compared to the baseline 208 at a particular point and the difference could be used to determine a correction coefficient for the focus curve associated with that lens assembly. For example, in one embodiment, the comparison of a lens assembly to the baseline may be made at the hyperfocal distance. A representative comparative difference for the three focus curves 202, 204, and 206 respectively is illustrated on the graph 200 by parenthesis 214, 216, and 218. The difference 214 represents the difference between points on curve 202 and the baseline curve 208 at the hyperfocal distance of the representative lens used in one embodiment of the disclosure. Similarly, the difference 216 represents the difference between curve 204 and the baseline curve 208 taken at the hyperfocal distance. The difference 218 represents difference between curve 204 and the baseline curve 208 taken at the hyperfocal distance. The hyperfocal distance was chosen because all lens are in optimal focus at the hyperfocal distance, thus this distance represents a true variance offset for a particular lens.

Additionally, because subsequent sample lenses can be examined starting at or near a minimum focus distance where the DAC digital number is fixed at 2000 (in this example embodiment by circuits, diodes and hardware), the differences 214, 216, and 218 at the hyperfocal curve end 212 can essentially viewed as the amount that each focus curve 202, 204, and 206 is "pivoted" about the minimum focus distance. The minimum focus distance for a particular lens is relevant in this situation because that distance often represents a physical limit fixed by the lens assembly manufacturer after the lens, lens actuator and/or image sensor has been assembled. Accordingly, at this minimum distance, there is typically very little focus variances between different representative lens assemblies. Thus, the differences between subsequently analyzed lens assembly optimal focus curves and the baseline curve taken at the hyperfocal distance are a good indicators of the correction coefficient that needs to be made all along a subsequently analyzed lens assembly values. The application of the correction coefficient will be discussed in greater detail in conjunction with FIG. 3 below. It will be appreciated that because optimal focus curves 204 and 206 lie beneath baseline curve 208, the correction coefficient established by the difference 216 and 218 respectively, may be a negative value. Similarly, because focus curve 202 lies above the baseline curve 208, the correction coefficient established by the difference 214 may have a positive value and vice versa.

Differences similar to 214, 216, and 218 in graph 200, for example, can be determined for lens assemblies prior to assembling them into finished products. Any such differences can then be used as the correction coefficient for the respective lens assemblies. In one embodiment, the correction coefficient is determined prior the processor using the lookup table. The correction coefficient can then be used to modify the lookup table using that particular lens' correction coefficient.

In one embodiment, instructions executable by the processor to determine a difference between a camera focus value and a baseline focus value are stored in memory. These instruction are also executable by the processor to adjust the values of the lookup table to account for the focus difference. The correction coefficient for every lens assembly can be determined and stored in memory to be used at any point in the autofocus process by the processor.

This variance normalization or focus adjustment feature allows company using a autofocus camera to determine a manufacturing variance or aberration for any particular lens assembly, such that all products using the lens assemblies perform substantially the same. It also offers the advantage that the videophone system's hardware, firmware and software can be established while giving the system the flexibility to easily change values depending upon the focus variance of a lens assembly.

The range of object of focus distance values along the horizontal axis in graph 200 were chosen to span a desirable distance for using the lens assembly in a finished product. By way of nonlimiting example, one range or area of distance in front of the camera that is known to be useful to the hearing-impaired community is between about 6 inches or about 150 mm to about 15 feet, or about 4.6 meters. Distances outside this range have been determined to be less useful for the purpose of having the camera pick up sign language motions or for a user to see sign language motions from further than this distance. Depending on the DAC used, a range of digital numbers can be used in the graph along the vertical axis that represent corresponding lens positions that span an area of importance or desired distance range for the particular use of the lens assembly. Thus, in one embodiment, the DAC is chosen and/or configured to have the ability to convert a range of digital numbers into analog power amounts that can power the lens actuator to position the lens such that optimal focuses can occur anywhere between 150 millimeters in front of the camera to about 4.6 meters in front of the camera.

It will be appreciated by those of skill in the art that once the distance in front of the camera is at least the near limit distance of the depth of field around the hyperfocal distance for a particular lens, object of focus at any distance beyond the near limit distance of the lens' hyperfocal depth of field will be in optimal focus. Thus, for practical purposes, a DAC needs to be chosen with a digital range sufficient to provide converted analog power for a range of lens positions, such that when the lens is moved, it can be focused on any distance between a desired minimum object of focus distance for a particular camera application to the near limit depth of field about the lens' hyperfocal distance. This assures an optimal focus for all such distances. The DAC and focus components need to also be chosen with lens manufacturer's electromechanical range of motion limits for the lens in mind.

In the embodiment illustrated by the graph 200, a 12-bit DAC was chosen, which provided 4,096 digital number options that could be converted and used to power the lens actuator of one embodiment of the present invention to all positions needed to optimally focus on a distance between 150 millimeters and the lens hyperfocal distance of around 2300 millimeters. As can be seen by reference to the graph 200, at one end 210 of the curves 202, 204, and 206, the DAC digital number 2000 correlates to a distance of 22 mm, or less than an inch, which is well below the minimum focus distance for the lens. At the other end 212 of the curves 202, 204 and 206, the DAC digital number for all curves 202, 204, and 206 is above DAC digital number 1600 as the distance is at or near the hyperfocal distance. Accordingly, for the illustrated embodiment, a DAC was chosen that could support digital numbers between about 1600 and about 2000, which corresponded to analog power sufficient to move the lens such that every distance in the desired range of 150 millimeters to about 2300 millimeters could be in optimal focus. Again, those of skill in the art will appreciate that because 2300 millimeters is within the depth of field of the hyperfocal distance, the DAC digital numbers between about 2000 and about 1600 cover a focus area of between 22 mm (or less then the minimum focus distance for the lens), and infinity. The 12-bit DAC used for the illustrated embodiment easily fits the desired range of 1600-2000 digital number within the DACs 1-4096 digital number capacity.

Figure 3:
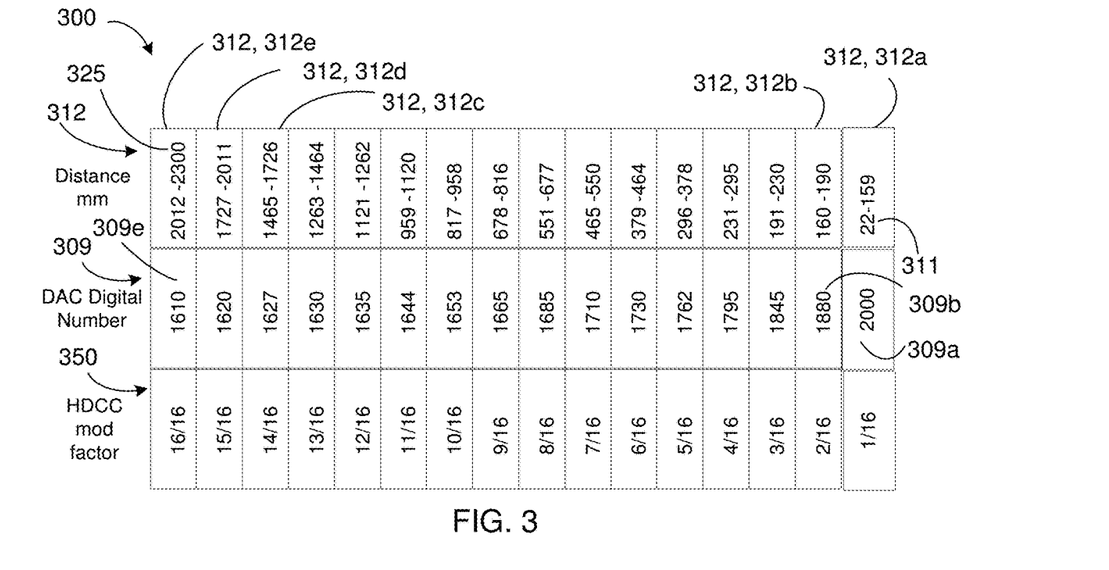
FIG. 3 is a table showing exemplary values of a lookup table in accordance with one or more embodiments of the disclosure.
Figure 3A:
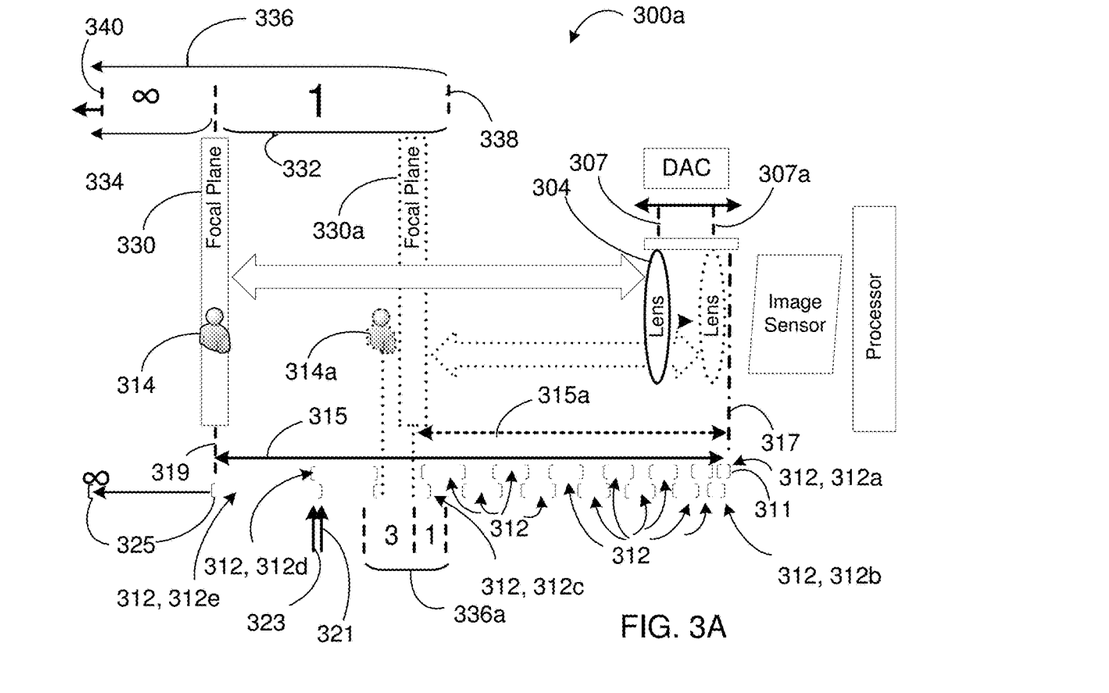
FIG. 3A is a schematic diagram of a plurality of distance ranges of FIG. 3 in accordance with one or more embodiment of the disclosure.

Turning now to FIGS. 3 and 3A, an exemplary lookup table 300 and corresponding physical world representation 300*a* of the exemplary lookup table 300 are shown respectively. Where the optimal focus baseline curve of Graph 200 established a point-to-point correlation between a DAC digital number and an distance in front of the lens where an object of focus would be in optimal focus, the lookup table 300 utilizes depth of field to establish a point-to-range relationship between a DAC digital number 309 and a range of distances 312 in front of the lens where an object of focus would be in optimal focus.

The lookup table 300 correlates multiple DAC digital numbers 309 to multiple ranges of distances 312 in a one-to-one correspondence. These ranges 312 may extend sequentially away from the camera lens 304. In one embodiment of the lookup table 300, DAC digital numbers 309 are chosen such that their corresponding distance ranges 312, overlap 313. For example, the near end boundary 321 of range of distances 312*d*, is closer to the lens 304 than the far end boundary 323 of range of distances 312*d*. In one embodiment, each range of distances 312 in the plurality of ranges of distances overlaps an immediately adjacent range of distances 312. See for example distance ranges 312c, 312d, and 312e. Accordingly, in one embodiment, the lookup table 300 includes a set of DAC digital numbers 309 that correlate to a range of distances 312 that span or include the entire desired or predetermined distance range 315. Thus, in one embodiment, a set of DAC digital numbers 309 can be chosen such that any object of focus 314 would be in optimal focus anywhere within the desired range 315. In one embodiment, the lookup table correlate between 9 and 17 ranges of distances 312 to between 9 and 17 DAC digital numbers 309 in a one-to-one correspondence.

In one embodiment, the desired range 315 is between the lens's 304 minimum focus distance 317 and the lens' 304 hyperfocal distance 319. In this embodiment, a first or closest range of distances 312a would have a near boundary distance 311 that is less than or equal to the minimum focus distance and last or farthest range of distances 312e would have a far boundary distance 325 that is greater than or equal to the hyperfocal distance 319. As discussed above, when the focal plane 330 associated with a lens position 307 approaches the hyperfocal distance 319, the ratio of the area 332 of the depth of field 336 before the focal plane 330 and the area 334 of the depth of field 336 after the focal plane 330 is 1:∞. Accordingly, the far limit 340 of the depth of field 336 about the focal plane 330 when the lens 304 if focused at the hyperfocal is infinity and the far end distance boundary 325 of the farthest range of distances 312e, could just as well be infinity as it is some value at or near the hyperfocal distance of 2300 mm shown in the lookup table.

In one embodiment, the plurality of ranges of distances spans a distance between the lens' minimum focus distance 317 and a distance at least halfway between the lens and the lens' hyperfocal distance. In yet another embodiment, the plurality of ranges of distances 312 spans a distance between the lens' minimum focus distance 317 and at least a near limit 338 of the depth of field 336 about a focal plane 330 at the hyperfocal distance 319. In another embodiment, the plurality of distance ranges 312 spans at least 90% of the distance between the lens' minimum focus distance and the lens' hyperfocal distance. In another embodiment, the plurality of distance ranges 312 spans at least 90% of the distance between about 150 mm in front of the lens 304 to about 2300 mm in front of the lens 304.

In one embodiment, the lookup table 300 is configured to correlate a distance 315a from the lens to an object of focus, with a DAC digital number 309 representing a lens position 307a, such that the object of focus 314a falls within a depth of field 336a about a focal plane 330a corresponding to the lens position 307a. It will be appreciated that embodiments of the present invention allow a relative small lookup table to be used to allow lens 304 to optimally focuses on an object of focus 314 anywhere in the desired distance range 315, thus allowing autofocus in a shorter amount of time.

When a difference between a focus curve for a particular lens assembly and the baseline focus curve indicates that a correction coefficient is needed to account for a variance, the amount of the correction coefficient is determine for each of the DAC digital numbers in the lookup table 300. In one embodiment, the amount of correction coefficient to apply to each DAC digital number in the lookup table is dependent upon the number of ranges of distances. A fraction of the correction coefficient is added or subtracted to each DAC digital number in the lookup table. The fraction if referred to in one embodiment as the HDCC modification factor 350. The modification is equal to the position of the range of distances, (with position 1 being the closest to the lens) divided by the total number of ranges of distances. In the illustrated embodiment, there are 16 ranges of distances 312. Thus, in this embodiment, a modification factor $1/16^{th}$ of the correction coefficient is added or subtracted (depending on whether the value of the lens focus curve at the hyperfocal distance is less then or greater than the value of the baseline focus curve at the same distance) to the DAC digital number 309a associated with closest range of distances 312a to the lens 304a. A modification factor of $2/16$ths of the correction coefficient is added or subtracted to the DAC digital number 309b associated with the second closest range of distances 312b and so on until a modification factor of $16/16^{th}$ (or in other words, the entire correction coefficient) is added or subtracted to the DAC digital number 309e associated with the farthest range of distances 312e.

Figure 4:
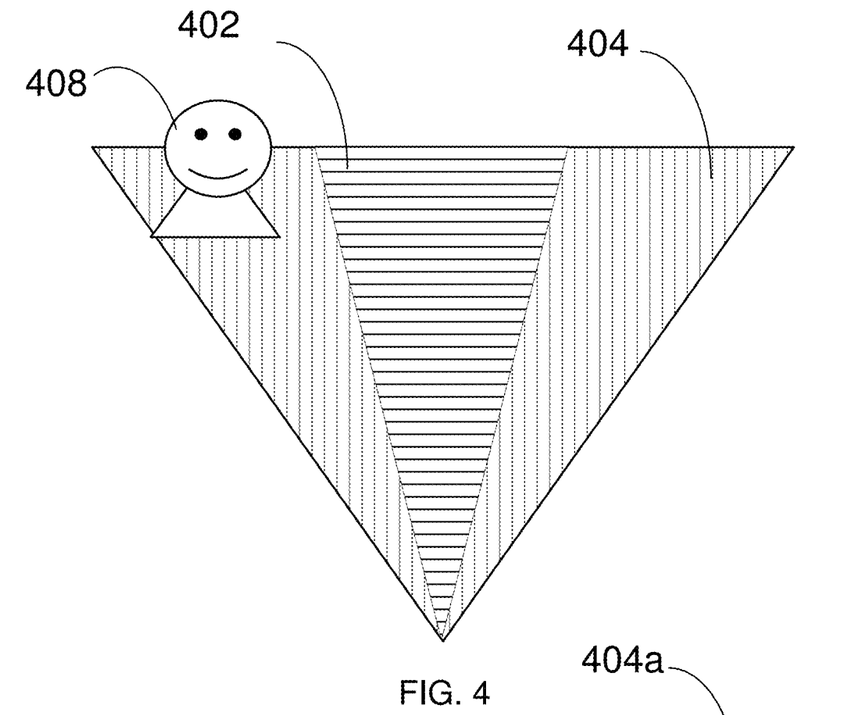
FIG. 4 is schematic diagram of a time-of-flight beam area and a camera field of view with an object of focus positioned in different areas.
Figure 4A:
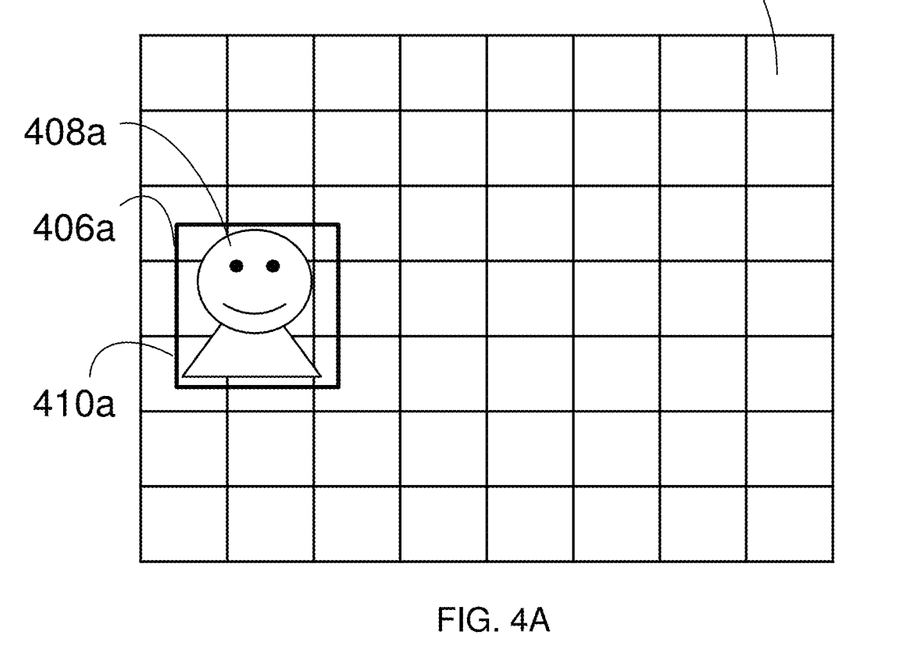
FIG. 4A is a schematic diagram of the field of view of FIG. 4 containing a designated region of interest.

Turning now to FIGS. 4 and 4A, a schematic of a Time of Flight sensor area 402 is shown over a field of view 404 and a region of interest 406a is shown in a field of view 404a respectively. In most instances, the ToF sensor are 402 will be less than the field view 404a. Accordingly, it is possible for a user 408 to position themselves outside the ToF sensor where active autofocus techniques aren't available because the distance sensor can't determine the distance between the camera lens and an object of focus outside the ToF sensor area. In this scenario, or the scenario where the infrared beam of the distance sensor is disturbed and give a false distance, the verification process may need to determine optimal focus. To speed up this process, the system has the user 408, 408a determine a region of interest to perform contrast analysis by allowing the user to "frame" themselves. This may be accomplished by the user using a remote control to move a frame 406a over the captured image in the field of view until it rests over the face of the user 408, 408a. this action allows the user to predetermine a region of interest 410a.

A source of infrared light from an open flame (birthday cake candles, for instance) can confuse the infrared sensor.

Figure 5:
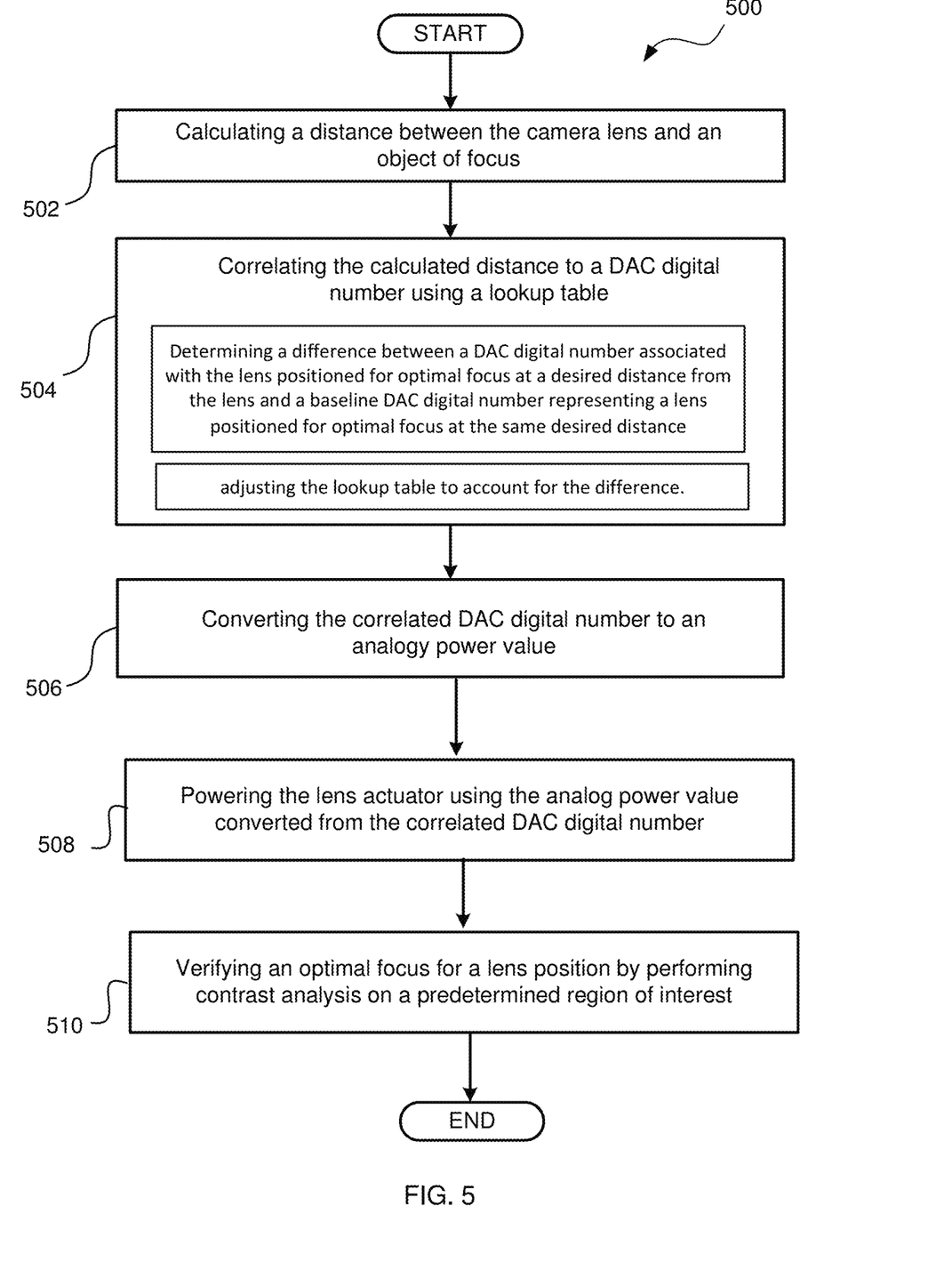
FIG. 5 is a schematic block diagram of method of autofocusing a camera in videophone system in accordance with one or more embodiments of the disclosure.

Turning now to FIG. 5, a block diagram of a method 500 of autofocusing a camera in a videophone system is shown. In one embodiment, the videophone system is one or more of the videophone system embodiments described herein. Thus, in one embodiment, the videophone system includes a camera lens, a camera lens actuator configured to move the camera lens, and an image sensor configured to capture an image received through the camera lens. The videophone system may also include a distance sensor configured to determine a distance from the camera lens to an object of focus. The videophone system may further include a digital to analog converter (DAC) configured to convert a plurality of DAC digital numbers to a plurality of analog power values, where each power value may be used to power the lens actuator to move the lens to a lens position.

The method 500 may include the step 502 of calculating a distance between the camera lens and an object of focus using the distance sensor. The method 500 may also include the step 504 of correlating the calculated distance to a DAC digital number using a lookup table. In one embodiment, the lookup table may be any of the lookup table embodiments described herein. The method 500 may also include the step 506 of converting the correlated DAC digital number to an analog power value. The method 500 may also include the step 508 of powering the lens actuator using the analog power value converted from the correlated DAC digital number to move the lens to a lens position wherein the object of focus is in optimal focus at the calculated distance.

In one embodiment, the method 500 further includes a step 510 of verifying an optimal focus for a lens position by performing contrast analysis on a predetermined region of interest.

The method 500, wherein the step 504 further includes determining a difference between a DAC digital number associated with the lens positioned for optimal focus at a desired distance or predetermined from the lens and a baseline DAC digital number representing a lens positioned for optimal focus at the same desired or predetermined distance. This determination may be accomplished using the processes described in connection with FIG. 2 above. In one embodiment, the desired or predetermined distance for determining the difference between a lens and a baseline is the hyperfocal distance for the lens. In one embodiment, the baseline is one of the baseline embodiments described herein. The correlating step 504 may further include adjusting the lookup table to account for the difference. This adjustment may be accomplished as discussed in connection with FIG. 3.

Figure 6:
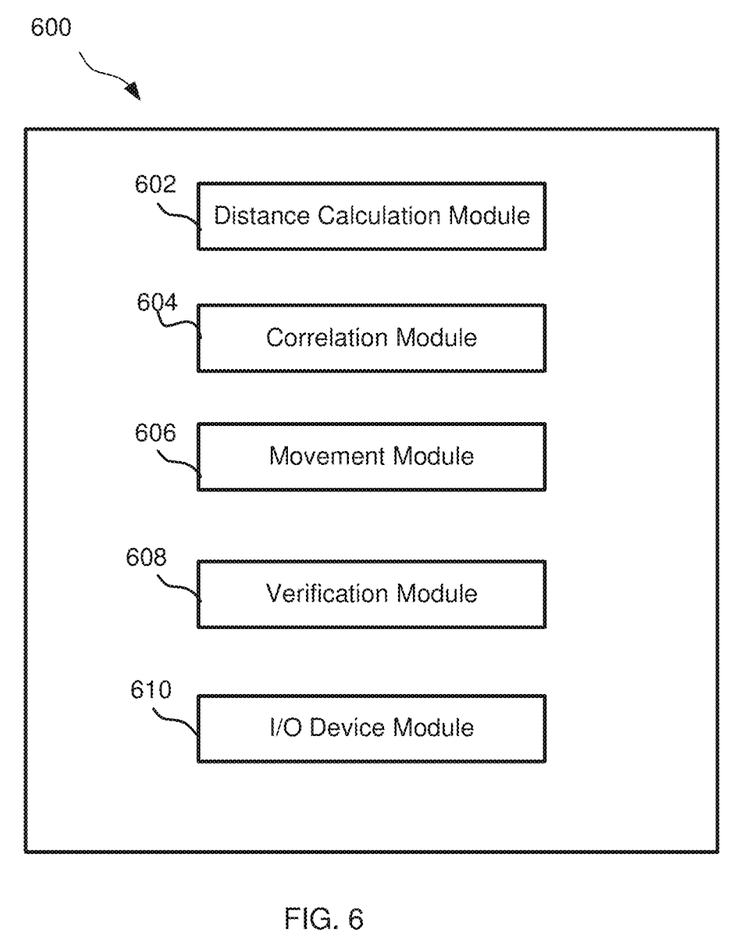
FIG. 6 is a schematic block diagram of a non-transitory computer-readable medium in accordance with one or more embodiments of the disclosure.

Referring now to FIG. 6, a non-transitory computer-readable medium 600 storing program instructions that, when executed on one or more processors cause the instructions to perform operations to accomplish the method steps of FIG. 5 and any of the videophone system functionality, processes, functions, features, aspects and algorithms described herein throughout. The program instructions may be in the form of computer code, software, or other implementing structures stored in memory. In one embodiment, the instructions may be in the form of modules configured to perform certain functions or aspects of the videophone system. In one embodiment, the non-transitory computer-readable medium 600 includes a distance calculation module 602 to calculate a distance between the camera lens and an object of focus using the distance sensor. The distance calculation module 602 may include interface instructions to allow the one or more processors to interface with the distance sensor. The module 602 may also prompt the distance sensor for data and facilitate the transfer of data the distance sensor and one or more processors (not shown).

The non-transitory computer-readable medium 600 may also include a correlation module 604 for correlating the distance calculated using the distance sensor to a DAC digital number using a lookup table. The correlation module 604 may include instructions for determining a difference between a DAC digital number associated with the lens positioned for optimal focus at a desired or predetermined distance from the lens and a baseline DAC digital number representing a lens positioned for optimal focus at the same desired or predetermined distance. In one embodiment, the desired distance for determining the difference between a lens and a baseline is the hyperfocal distance for the lens. The correlating module 604 may include instructions for adjusting the lookup table to account for the difference.

The non-transitory computer-readable medium 600 may also include a movement module 606 with coded instructions to power the lens actuator using the analog power value converted from the correlated DAC digital number to move the lens to a lens position wherein the object of focus is in optimal focus at the calculated distance. Thus, the movement module 606 may include an interface with the DAC and with the lens actuator in order to make the necessary conversion and provide the power value to move the lens.

In one embodiment, the non-transitory computer-readable medium 600 includes a verification module 608 for performing passive autofocus techniques such as contrast detection and phase detection to verify that the object of focus is in optimal focus. In one embodiment, the verification module 608 includes coded instruction to prompt for and/or determine a region of interest for the image captured by the image sensor at the lens position. The module 608 may further include instruction to perform contrast detection analysis on the region of interest to verify that the object of focus is in optimal focus.

In one embodiment, the non-transitory computer-readable medium 600 includes an I/O module 610 to facilitate the use of the system by a user.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

The scope of the present invention is defined by the appended claims.

What is claimed is:

1. A videophone system, comprising:
   a camera lens;
   a lens actuator configured to move the camera lens;
   an image sensor configured to capture an image received through the camera lens;
   a distance sensor configured to determine a distance from the camera lens to an object of focus;
   a digital to analog converter (DAC) configured to convert a plurality of DAC digital numbers to a plurality of analog power values, each power value used to power the lens actuator to move the camera lens to a lens position;
   a memory configured to store instructions, wherein the memory comprises a lookup table configured to correlate a DAC digital number to a distance between the camera lens and an object of focus where the object of focus is in optimal focus at the distance; and
   a processor operatively coupled with the memory and configured to execute the instructions to perform operations, the operations comprising:
      calculating a distance between the camera lens and an object of focus using the distance sensor;
      correlating the calculated distance to a DAC digital number using the lookup table;
      converting the DAC digital number correlating to the calculated distance into an analog power value using the DAC;
      powering the lens actuator using said analog power value to move the camera lens to a lens position wherein the object of focus is in optimal focus at said calculated distance; and
      determining if there is a difference between a DAC digital number associated with the camera lens positioned for optimal focus at a predetermined distance from the camera lens and a baseline DAC digital number representing a lens positioned for optimal focus at the same predetermined distance.

2. The video system of claim 1, wherein the operations further comprise verifying that the object of focus is in optimal focus at the calculated distance by performing one or more of contrast detection analysis and phase detection analysis on the image captured by the image sensor at the lens position.

3. The video system of claim 2, wherein verifying the object of focus is in optimal focus comprises selecting a region of interest for the image captured by the image sensor at the lens position and performing contrast detection analysis on the region of interest.

4. The video system of claim 1, wherein the operations further comprise adjusting the lookup table to account for the difference.

5. The video system of claim 1, wherein the lookup table is configured to correlate a DAC digital number to a range of distances between the camera lens and an object of focus wherein the object of focus is in optimal focus when the object of focus is within the range of distances.

6. The video system of claim 5, wherein the range of distances correlating to each DAC digital number is within a depth of field about a focal plane for a lens position associated with the DAC digital number.

7. The video system of claim 5, wherein the lookup table is configured to correlate a plurality of DAC digital numbers to a plurality of ranges of distances.

8. The video system of claim 7, wherein the plurality of ranges of distances spans a distance between the camera lens' minimum focus distance and a distance at least halfway between the camera lens and the camera lens' hyperfocal distance.

9. The video system of claim 7, wherein each range of distances in the plurality of ranges of distances overlaps an immediately adjacent range of distances.

10. The video system of claim 7, wherein the lookup table correlates between 9 and 17 ranges of distances to between 9 and 17 DAC digital numbers in a one-to-one correspondence.

11. A method of autofocusing a camera in a videophone system, the videophone system comprising a camera lens, a lens actuator configured to move the camera lens, an image sensor configured to capture an image received through the camera lens, a distance sensor configured to determine a distance from the camera lens to an object of focus, and a digital to analog converter (DAC) configured to convert a plurality of DAC digital numbers to a plurality of analog power values, each power value used to power the lens actuator to move the camera lens to a lens position, the method comprising:
 calculating a distance between the camera lens and an object of focus using the distance sensor;
 correlating the calculated distance to a DAC digital number using a lookup table, wherein correlating the calculated distance to a DAC digital number using the lookup table comprises determining a difference between a DAC digital number associated with the camera lens positioned for optimal focus at a predetermined distance from the camera lens and a baseline DAC digital number representing a lens positioned for optimal focus at the same predetermined distance;
 powering the lens actuator using the analog power value converted from the correlated DAC digital number move the camera lens to a lens position wherein the object of focus is in optimal focus at the calculated distance.

12. The method of claim 11, further comprising selecting a region of interest for the image captured by the image sensor at the lens position and performing contrast detection analysis on the region of interest to verify that the object of focus is in optimal focus.

13. The method of claim 11, wherein correlating the calculated distance to a DAC digital number using the lookup table further comprises adjusting the lookup table to account for the difference.

14. The method of claim 11, wherein the lookup table is configured to correlate a DAC digital number to a range of distances between the camera lens and an object of focus wherein the object of focus is in optimal focus when the object of focus is within the range of distances.

15. The method of claim 14, wherein the range of distances correlating to each DAC digital number is within a depth of field about a focal plane for a lens position associated with the DAC digital number.

16. The method of claim 14, wherein the lookup table is configured to correlate a plurality of DAC digital numbers to a plurality of ranges of distances.

17. The method of claim 16, wherein the plurality of ranges of distances spans a distance between the camera lens' minimum focus distance and a distance at least halfway between the camera lens and the camera lens' hyperfocal distance.

18. The method of claim 16, wherein each range of distances in the plurality of ranges of distances overlaps an immediately adjacent range of distances.

19. The method of claim 16, wherein the lookup table correlates between 9 and 17 ranges of distances to between 9 and 17 DAC digital numbers in a one-to-one correspondence.

20. A non-transitory computer-readable medium storing program instructions that, when executed on one or more processors cause the instructions to perform operations, the operations comprising:
 calculating a distance between a camera lens and an object of focus using a distance sensor;
 correlating the calculated distance to a DAC digital number using a lookup table, wherein the operation of correlating the calculated distance to a DAC digital number using the lookup table further comprises determining a difference between a DAC digital number associated with the camera lens positioned for optimal focus at a predetermined distance from the camera lens and a baseline DAC digital number representing a lens positioned for optimal focus at the same predetermined distance; and
 powering a lens actuator using an analog power value converted from the correlated DAC digital number to move the camera lens to a lens position wherein the object of focus is in optimal focus at the calculated distance.

21. The non-transitory computer-readable medium of claim 20, wherein the operations further comprise selecting a region of interest for an image captured by an image sensor at the lens position and performing contrast detection analysis on the region of interest to verify that the object of focus is in optimal focus.

22. The non-transitory computer-readable medium of claim 20, further comprising adjusting the lookup table to account for the difference.

23. The non-transitory computer-readable medium of claim 20, wherein the lookup table is configured to correlate a DAC digital number to a range of distances between the camera lens and an object of focus, wherein the object of focus is in optimal focus when the object of focus is within the range of distances.

24. The non-transitory computer-readable medium of claim 23, wherein the range of distances correlating to each DAC digital number is within a depth of field about a focal plane for a lens position associated with the DAC digital number.

25. The non-transitory computer-readable medium of claim 23, wherein the lookup table is configured to correlate a plurality of DAC digital numbers to a plurality of ranges of distances.

26. The non-transitory computer-readable medium of claim 25, wherein the plurality of ranges of distances spans a distance between the camera lens' minimum focus distance and a distance at least halfway between the camera lens and the camera lens' hyperfocal distance.

27. The non-transitory computer-readable medium of claim 25, wherein each range of distances in the plurality of ranges of distances overlaps an immediately adjacent range of distances.

28. The non-transitory computer-readable medium of claim 25, wherein the lookup table correlates between 9 and 17 ranges of distances to between 9 and 17 DAC digital numbers in a one-to-one correspondence.

* * * * *